(12) United States Patent
Tanaka et al.

(10) Patent No.: US 7,938,583 B2
(45) Date of Patent: May 10, 2011

(54) ROLLING BEARING

(75) Inventors: Hideaki Tanaka, Mie (JP); Ryouichi Nakajima, Mie (JP)

(73) Assignee: NTN Corporation, Osaka (JP)

( * ) Notice: Subject to any disclaimer, the term of this patent is extended or adjusted under 35 U.S.C. 154(b) by 739 days.

(21) Appl. No.: 11/783,696

(22) Filed: Apr. 11, 2007

(65) Prior Publication Data

US 2007/0242912 A1    Oct. 18, 2007

(30) Foreign Application Priority Data

Apr. 13, 2006  (JP) ................................. 2006-110858

(51) Int. Cl.
  *F16C 33/66*   (2006.01)
  *F16C 33/44*   (2006.01)
(52) U.S. Cl. .................. 384/470; 384/463; 384/907
(58) Field of Classification Search .................. 384/462, 384/463, 470, 492, 907
  See application file for complete search history.

(56) References Cited

U.S. PATENT DOCUMENTS

| | | | | |
|---|---|---|---|---|
| 4,492,415 A | * | 1/1985 | Baile et al. ..................... | 384/463 |
| 5,529,401 A | * | 6/1996 | Gabelli et al. ................. | 384/470 |
| 5,588,751 A | * | 12/1996 | Nakata et al. .................. | 384/463 |
| 5,762,423 A | | 6/1998 | Mori et al. | |
| 6,432,887 B1 | * | 8/2002 | Yamamoto et al. ............ | 508/138 |
| 6,450,691 B1 | * | 9/2002 | Okuma et al. ................. | 384/477 |
| 6,699,926 B2 | * | 3/2004 | Yabe et al. ..................... | 524/476 |
| 7,402,550 B2 | * | 7/2008 | Iso ................................. | 508/182 |
| 2004/0165800 A1 | * | 8/2004 | Kato et al. ..................... | 384/470 |
| 2004/0170347 A1 | | 9/2004 | Ikeda et al. | |
| 2005/0100259 A1 | * | 5/2005 | Egami et al. .................. | 384/477 |

FOREIGN PATENT DOCUMENTS

| | | |
|---|---|---|
| CN | 1147605 | 4/1997 |
| CN | 1548783 | 11/2004 |
| JP | 6-313435 | 11/1994 |
| JP | 2000-87982 | 3/2000 |
| JP | 2002-021863 | 1/2002 |
| JP | 2003-139147 | 5/2003 |
| JP | 2004-150477 | 5/2004 |
| WO | 03/029669 | 4/2003 |

OTHER PUBLICATIONS

Chinese Office Action issued Nov. 6, 2009 in corresponding Chinese Application No. 200710092090.1 (with English translation).
Notice of Reasons for Rejection, issued Mar. 9, 2010 in counterpart Japanese Application 2006-110858 (with partial English translation).
Japanese Preliminary Report (with partial English translation) issued Sep. 17, 2010 in connection with corresponding Japanese Application No. 2006-110858.

* cited by examiner

*Primary Examiner* — Thomas R Hannon
(74) *Attorney, Agent, or Firm* — Wenderoth, Lind & Ponack, L.L.P.

(57) ABSTRACT

A rolling bearing made of stainless steel for use in conditions where hydrofluoric acid or fluorine grease is present can prevent boundary lubrication due to the invasion of metal corrosion powder into rolling surface of the bearing, and thus prevent the rapid advance of internal wear. The rolling bearing is highly durable and has a long life even if used in metal corrosive environments. A deep-groove rolling bearing includes bearing rings (inner ring and outer ring), rolling elements, and a retainer all made of stainless steel, and solidified lubricating oil sealed in the rolling bearing. The solidified lubricating oil is made by heat curing a mixture of lubricating oil or grease containing perfluoropolyether and a thermoplastic resin. Contact seals made of fluorine rubber seal the solidified lubricating oil. Even if metal abrasion powder is produced by effect of perfluoropolyether or hydrofluoric acid, it will be held embedded in the solidified lubricating oil, so that abnormal wear will not occur.

20 Claims, 1 Drawing Sheet

ROLLING BEARING

BACKGROUND OF THE INVENTION

The present invention relates to rolling bearings, particularly to rolling bearings suitable for use with a cleaning/chemical polishing apparatus used in environments in which they are brought into contact with corrosive fluoride compounds for cleaning and chemical polishing.

Generally, in wafer cleaning and chemical polishing steps in semiconductor manufacturing facilities, corrosive fluoride compounds such as hydrofluoric acid are used as cleaning agents or surface treatment agents. For example, in a Chemical Mechanical Polishing (CMP) apparatus, wafer surfaces are cleaned and polished by a rotary brush while showering hydrofluoric acid on wafers.

Rolling bearings used in or with the carrying unit and rotary brush of such a cleaning apparatus are made of a corrosion-resistant material. For example, bearing rings, rolling elements and retainers made of stainless steel are adopted (JP patent publication 2003-139147A).

On the other hand, in automotive electric accessories, for which improved heat resistance is required, fluorine lubricating grease is sealed in rolling bearings used in such accessories and contact seals made of fluorine rubber for sealing the gap between inner and outer rings are adopted (JP patent publication 2004-150477A).

The above-mentioned heat-resistant fluorine lubricating grease is made by mixing perfluoropolyether oil with a thickening agent formed of fluorine resin particles such as polytetrafluoroethylene (hereinafter PTFE) for thickening.

Such fluorine lubricating greases are stable to various kinds of solvents. Thus they are suitable as lubricating greases for rolling bearings used in a cleaning apparatus.

But if such fluorine lubricating grease is sealed in conventional rolling bearings having bearing rings, rolling elements, and a retainer that are each made of stainless steel, perfluoropolyether (PFPE) mixed therein as a base oil reacts with stainless steel of the metal material in a boundary lubrication state. As a result, the main chain of PFPE is cut at positions of the ether groups and a fluoride (RF—COF) having an acyl group is produced. The fluoride is a kind of Lewis acid having extremely high corrosivity and acts on PFPE, which is a base oil, as a decomposition catalyst, so that the fluorine lubricating grease will be rapidly decomposed and flow away, thus causing metal abrasion of the rolling bearing.

By such corrosion mechanism, rolling bearings made of stainless steel and having fluorine lubricating grease sealed therein tend to have a short component life due to the rapid progression of internal wear.

Also, even rolling bearings made of stainless steel which do not contain fluorine lubricating grease corrode and produce metallic abrasion powder in use conditions in which they are exposed to hydrofluoric acid as a cleaning or polishing agent. The metal abrasion powder infiltrates into rolling portions of the bearing, causing boundary lubrication and thus abnormal bearing wear.

An object of the present invention is to provide a rolling bearing made of stainless steel which, in highly corrosive use conditions where hydrofluoric acid or fluorine grease is present, can suppress boundary lubrication resulting from infiltration of metal corrosion powder into rolling surface of the bearing and rapid progression of internal wear, and which is highly durable and has a long life even if used in metal corrosive environments.

SUMMARY OF THE INVENTION

According to the present invention, there is provided a rolling bearing which comprises bearing rings, rolling elements, and a retainer, which are all made of stainless steel, a solidified lubricating oil sealed in the rolling bearing, the solidified lubricating oil being obtained by heat-curing a mixture of lubricating oil or grease and a thermoplastic resin or a thermosetting resin, and contact seals made of fluorine rubber for sealing the solidified lubricating oil.

With the rolling bearing of this invention, because the gap between the inner ring and the outer ring is sealed by contact seals made of fluorine rubber, the seals will not be affected by contact with a metal corrosive agent such as hydrofluoric acid, thus preventing its infiltration reliably.

Also, because a solidified lubricating oil obtained by heat-curing a mixture of lubricating oil or grease and a thermoplastic resin or a thermosetting resin is sealed in the rolling bearing, even if the lubricating oil or grease contains perfluoropolyether and a corrosive fluoride produced in the rolling bearing in boundary lubrication causes corrosion of metal and produces abrasion powder, the metal abrasion powder will be held as if embedded in the heat cured solidified lubricating oil. This prevents it from infiltrating onto the rolling surfaces (the surfaces of the rolling elements and the surfaces of the inner and outer rings which the rolling elements contact), so that abnormal wear will not occur.

Also, even if perfluoropolyether (PFPE) reacts with a metal and a metal fluoride is produced, only part of the lubricating oil that has oozed out onto the surface of the solidified lubricating oil may be decomposed, but the lubricating oil held inside will not be decomposed. Therefore, the rolling surfaces will be kept supplied with normal lubricating oil and the solidified lubricating oil will continue to function normally.

As described above, because the entire lubricating grease retained in the solidified lubricating oil is never decomposed at one time or flows away, the rolling bearing of this invention can work as a corrosion resistant rolling bearing having a longer life than conventional bearings of this kind even if used in metal corrosive environments.

In order to provide such a long-life rolling bearing, it is preferable that the rolling elements used are made of a ceramic material, which has excellent corrosion resistance, because a low amount of metallic corrosion powder produced urges a longer life.

Also, the rolling bearing of such a structure is extremely suitable for use with a cleaning/chemical polishing apparatus in which they are exposed to a corrosive fluoride such as hydrofluoric acid.

According to the present invention, because a solidified lubricating oil obtained by heat-curing a mixture of lubricating oil or grease and a thermoplastic resin or thermosetting resin is sealed in the bearing by contact seals made of fluorine rubber, if the rolling bearing made of stainless steel is used in corrosive use conditions where hydrofluoric acid or fluorine grease is present, metallic corrosion powder will not infiltrate into the rolling surfaces and normal lubricating oil will be kept supplied without being decomposed, thus preventing abnormal wear or rapid progression of internal wear.

Due to these advantages, the rolling bearing of this invention can work as a long life rolling bearing even if used with a cleaning/chemical polishing apparatus using corrosive fluorides.

BRIEF DESCRIPTION OF THE DRAWINGS

Other features and objects of the present invention will become apparent from the following description made with reference to the accompanying drawings, in which.

DETAILED DESCRIPTION OF THE INVENTION

One embodiment of the present invention will be described below with reference to the accompanying drawings.

Figure 1:
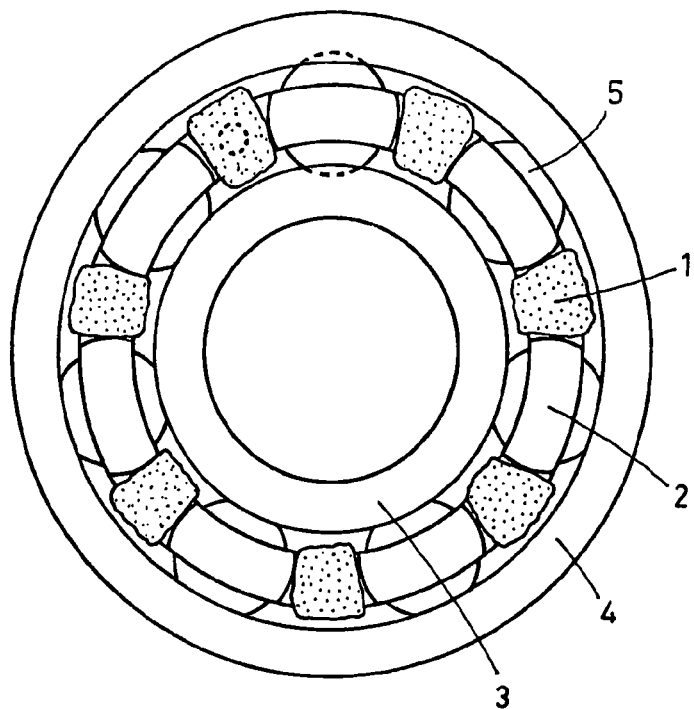
FIG. 1 is a plan view of the rolling bearing according to this invention with its seals removed.
Figure 2:
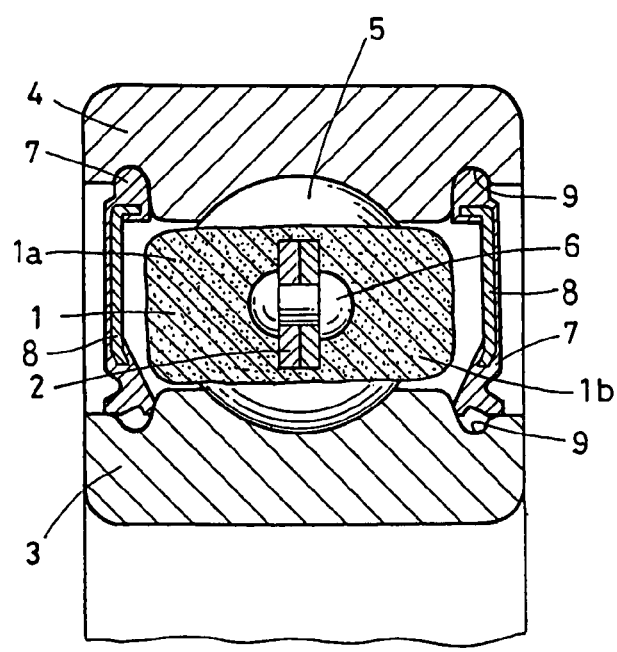
FIG. 2 is an enlarged sectional view of a portion of the same.

As shown in FIGS. 1 and 2, the embodiment is a deep-groove ball bearing having solidified lubricating oil 1 applied to both axial sides of a retainer 2 and heat-cured. Particularly, it comprises an inner ring 3 and an outer ring 4 as bearing rings, rolling elements 5 and the retainer 2, which are all made of stainless steel, and contains the solidified lubricating oil 1 made by heat-curing a mixture of a lubricating grease and a thermoplastic resin and sealed by contact seals 7 made of fluorine rubber.

The materials of the component parts are described below in detail. The solidified lubricating oil 1 is a semi-solid lubricative composition obtained by mixing a lubricating oil or grease with resin powder. It is applied to both axial sides of the retainer 2 (that is, both sides of portions for spacing the rolling elements 5 at equal distances, shown at 1a and 1b in FIG. 2) and heat-cured so as to be held in position.

The lubricant contained in the solidified lubricating oil used in this invention may be lubricating oil or lubricating grease. As the lubricating oil, mineral oil, synthesized hydrocarbon oil, polyalkylene glycol oil, diester oil, polyester oil, phosphate ester oil, polyphenyl ether oil, silicone oil, perfluoropolyether oil, etc. may be used. Any known lubricating oil may be used.

The perfluoropolyether oil is a compound obtained by substituting fluorine atoms for hydrogen atoms of aliphatic hydrocarbon polyether. Commercially available ones include Fomblin Y (made by Montedison), Krytox (made by DuPont), Barrierta J oil (made by Kluber), Fomblin Z (made by Montedison), Fomblin M (made by Montedison) and Demnum (made by Daikin).

The lubricating grease may be one obtained by thickening base oil by use of a soap or non-soap thickening agent. The kinds of the base oil and thickening agent are not particularly limited. Combinations of thickening agent and base oil include lithium soap—diester grease, lithium soap—mineral oil grease, potassium soap—mineral oil grease, aluminum soap—mineral oil grease, lithium soap—diester mineral oil grease, non-soap thickening agent—diester oil grease, non-soap thickening agent—mineral oil grease, non-soap thickening agent—polyol ester oil grease, lithium soap—polyol ester oil grease, and lithium soap—silicone oil grease. Also, a grease using perfluoropolyether oil as base oil and fluorine resin particles as a thickening agent may be used.

Greases or oils obtained by adding a metallic soap or non-soap (fluorine resin particles, diurea, polyurea, etc.) thickening agent to the lubricating oils described above as a base oil to adjust the viscosity may be used after adding an extreme pressure agent or other additives.

As resin material powder used to solidify a lubricating oil to obtain the solidified lubricating oil of the present invention, thermoplastic resin powder such as ultrahigh molecular weight polyolefin resin may be used.

As the thermoplastic resin powder, powder of any known thermoplastic resin may be used. Such thermoplastic resins include ultrahigh molecular weight polyolefin powder, polyamide resin (nylon), polyacetal resin, methylmetaacryl resin, acryl-styrene copolymer resin, polystyrene, ABS resin, vinyl chloride resin, polyvinylidene fluoride, polycarbonate, fluoride resin, acetate cellulose, and celluloid.

The ultrahigh molecular weight polyolefin resin powder may be a powder of ultrahigh molecular weight polyethylene, ultrahigh molecular weight polypropylene, ultrahigh molecular weight polybutene or a copolymer thereof. The molecular weight of each powder should be $1 \times 10^6$ to $5 \times 10^6$ in terms of average molecular weight as measured by viscosity method. Polyolefines in such a molecular weight range are superior to low molecular weight polyolefines in rigidity and oil retainability and hardly flow even when heated to high temperature. Also, as for average particle size of thermoplastic resin powder, favorable results have been obtained when 10 to 30 μm powder was adopted.

The content of thermoplastic resin in the solidified lubricating oil is preferably 95 to 1 weight %, depending on the desired oil separation, toughness, and hardness of the composition. Therefore, the higher the content of thermoplastic resin such as ultrahigh molecular weight polyolefine, the harder the gel after dispersed and retained at predetermined temperature becomes.

As the resin for thermosetting resin powder used as a material of the solidified lubricating oil used in this invention, phenol resin, urea resin, melamine resin, urethane resin, polyester resin, diarylphthalate resin, and epoxy resin may be used.

As the thermosetting resin, its not-yet-cured material powder is used and mixed with a lubricating oil or grease. The mixing ratio is not limited, but they are mixed together in the range of 5 to 95 weight %, for example. This thermosetting resin powder or thermoplastic resin powder is mixed with a lubricating oil or grease into a uniform paste, semi-solid state with oil not separated, and the mixture is spot-packed in the bearing, or full-packed in the entire space in the bearing. In spot packing, it is preferable to apply to at least both sides of the portions of the retainer for keeping the spaces between the rolling elements, hold them wrapped and then heat.

The contact seal 7 is an annular elastic member having a core 8 covered with fluorine rubber. It is mounted in a mounting groove 9 of the outer ring 4 with its seal lip, which is a part of the elastic member and has an inclined inner periphery, in slidal contact with the sealing contact surface of the inner ring 3.

As a fluorine rubber used for the contact seal, vulcanizable fluorine rubber containing tetrafluoroethylene-propylene 2-unit copolymer, vulcanizable fluorine rubber containing vinylidene fluoride-tetrafluoroethylene-propylene 3-unit copolymer, or vulcanizable fluorine rubber containing tetrafluoroethylene-perfluoroalkylvinylether 3-unit copolymer may be used.

As tetrafluoroethylene-propylene 2-unit copolymer, AFLAS 150 series and AFLAS 100 series of Asahi Glass Co., Ltd. are commercially available.

Vinylidene fluoride-tetrafluoroethylene-propylene 3-unit copolymer is commercially available in the name of BRE LJ-298005 made by Sumitomo 3M Limited, AFLAS SP and AFLAS MZ201 of Asahi Glass Co., Ltd.

As tetrafluoroethylene-perfluoroalkylvinylether 3-unit copolymer, Kalrez made by Du Pont can be cited.

Such fluorine polymers described above are vulcanized by use of a vulcanizing assistant such as triarylisocyanurate, and triarylcyanurate and organic peroxide such as α,α-bis-t-butylperoxy-diisopropylbenzene, 2,5-dimethyl-2,5-di-t-butylperoxy hexane, and exhibit rubber elasticity.

Also, before vulcanizing the above said fluorine polymers, inorganic fillers such as carbon black, silica, silicic acid, and diatomaceous earth, metallic oxides such as zinc oxide and magnesium oxide, age resistors such as octylated diphenyl amine and N-phenyl-1-naphtyl amine or other additives may be added as necessary.

Example 1 of the Invention

Deep-groove ball bearings (inner diameter: 10 mm, outer diameter: 26 mm, width: 8 mm) with contact seals as shown in FIGS. 1 and 2 were made as follows: That is, the inner and outer rings were made of stainless steel (SUS440C), the rolling elements were made of silicate nitride ceramics ($Si_3N_4$), and the retainer was made of stainless steel (SUS304). For the solidified lubricating oil, lithium-mineral oil grease containing polyethylene resin powder was used. General-purpose Polylube LP03 made by NTN and having a softening temperature of about 80° C. and a curing temperature of about 130° C. was spot packed on both axial sides of the retainer in the bearing, and heat cured. Then, the gap between the outer ring and the inner ring was sealed by contact seals of fluorine rubber. The rolling bearings of this invention were obtained by doing so. The rolling bearings were subjected to the following durability tests under the conditions corresponding to the actual use conditions.

(Durability Test)

Load Fa=10 N (preload) was applied to the deep-groove ball bearing with the contact seals while showering hydrofluoric acid against them. The rotation speed was increased from 0 to 1000 rpm in 30 seconds and then decreased to zero and stopped in another 30 seconds. Assuming that this step represents one cycle, it was repeated 500000 cycles to determine the life of the bearing.

For judging component life, the degree of wear inside the bearing was evaluated in terms of relative widening of the radial inside gap. The bearing was judged to have ended its life when the radial inside gap widened to 10 times the initial gap. The test was continued up to 500000 cycles if necessary. The results are shown in Table 1.

In addition to the radial inside gap, the bearings were evaluated for corrosion of the inner and outer rings, corrosion of the rolling elements, sealing by the contact seals, and deterioration of grease in four grades, namely best ◉, good ○, passable Δ, and impassable X. The evaluation results are shown in Table 1.

TABLE 1

| No. | Test item | | | | |
| --- | --- | --- | --- | --- | --- |
| | Radial inside gap | Corrosion of inner/outer ring | Corrosion of rolling element | Sealing by seal | Deterioration of lubricant |
| Example of the invention 1 | ◉ | ○ | ○ | ○ | ○ |
| Comparative Example 1 | X | X | X | X | X |
| Comparative Example 2 | X | X | X | X | X |
| Comparative Example 3 | X | X | X | ○ | X |
| Comparative Example 4 | Δ | X | ○ | ○ | X |

Comparative Example 1

A deep-groove ball bearing with non-contact seal made of soft steel (SPCC) (inner diameter: 10 mm, outer diameter: 26 mm, width: 8 mm) was made in the following manner. The inner ring, outer ring and rolling elements were made of bearing steel (SUJ2) and the retainer was made of soft steel (SPCC), and mineral oil grease (lithium soap used as thickening agent) was sealed as a lubricant. The rolling bearing obtained was tested for durability under the same conditions as described above. The results are shown in Table 1.

Comparative Example 2

A deep-groove ball bearing with contact seals made of nitrile rubber (inner diameter: 10 mm, outer diameter: 26 mm, width: 8 mm) was made in the following manner. The inner ring, outer ring and rolling elements were made of bearing steel (SUJ2) and the retainer was made of soft steel (SPCC), and mineral oil grease (lithium soap used as thickening agent) was sealed as a lubricant. The rolling bearing obtained was tested for durability under the same conditions as described above. The results are shown in Table 1.

Comparative Example 3

A deep-groove ball bearing with contact seals made of fluorine rubber (inner diameter: 10 mm, outer diameter: 26 mm, width: 8 mm) made in the following manner. The inner ring, outer ring and rolling elements were made of stainless steel (SUS440C) and the retainer was made of stainless steel (SUS304), and fluorine grease (PTFE powder used as thickening agent) was sealed as a lubricant. The rolling bearing obtained was tested for durability under the same conditions as described above. The results are shown in Table 1.

Comparative Example 4

A deep-groove ball bearing with contact seals made of fluorine rubber (inner diameter: 10 mm, outer diameter: 26 mm, width: 8 mm) made in the following manner. The inner ring and outer ring were made of stainless steel (SUS440C) and the rolling elements were made of a ceramic material ($Si_3N_4$) and the retainer was made of stainless steel (SUS304), and fluorine grease (PTFE powder used as thickening agent) was sealed as a lubricant. The rolling bearing obtained was tested for durability under the same conditions as described above. The results are shown in Table 1.

As clearly seen from Table 1, as for Comparative Example 1, hydrofluoric acid invaded into the bearing and the radial inside gap widened ten times or over and the evaluation was impassable in all other points.

As for Comparative Example 2, the contact seal made of nitrile rubber was corroded by hydrofluoric acid, which invaded into the bearing, so that the radial inside gap widened ten times or over.

As for Comparative Example 3, the time required for the widening of the radial inside gap up to ten times was longer in comparison with the Comparative Examples 1 and 2, but corrosion and wear of the inner ring, outer ring, races, and rolling elements were observed.

As for Comparative Example 4, corrosion and wear were observed on the races of the inner ring and the outer ring. Such wear was not observed on the rolling elements, but metal powder produced by abrasion got into the rolling surface, thus making the rolling elements impossible to turn.

On the other hand, in Example 1, little increase of the radial inside gap was observed even after 500000 cycles in the durability test and good rotation condition continued.

What is claimed is:

1. A corrosion-resistant rolling bearing comprising:
   an inner bearing ring made of stainless steel;
   an outer bearing ring made of stainless steel;
   rolling elements made of a ceramic material;
   a retainer made of stainless steel, the retainer spacing adjacent rolling elements apart from each other;
   a solidified lubricating oil sealed in the rolling bearing, said solidified lubricating oil being made by heat-curing a mixture of lubricating oil or lubricating grease and a thermoplastic resin or a thermosetting resin; and contact seals made of fluorine rubber sealing said solidified lubricating oil in the rolling bearing, wherein the solidified lubricating oil is applied to portions of the retainer between the rolling elements so as to wrap the portions, wherein the solidified lubricating oil forms a mass in the space between each pair of adjacent rolling elements and between the inner bearing ring and the outer bearing ring, and each mass has a dimension in an axial direction of the rolling bearing which is substantially larger than a dimension of the mass in a radial direction of the rolling bearing and a dimension of the mass in a circumferential direction of the rolling bearing, wherein the solidified lubricating oil is spaced apart from the inner bearing ring and the outer bearing ring, and wherein the solidified lubricating oil is configured to prevent infiltration of metal abrasion powder onto rolling surfaces of the inner bearing ring and the outer bearing ring.

2. A corrosion-resistant rolling bearing comprising:
an inner bearing ring made of stainless steel;
an outer bearing ring made of stainless steel;
rolling elements made of a ceramic material provided between the inner bearing ring and the outer bearing ring for allowing movement of the inner bearing ring relative to the outer bearing ring;
a retainer made of stainless steel, the retainer spacing adjacent rolling elements apart from each other;
a solidified lubricating oil sealed in the rolling bearing, said solidified lubricating oil being made by heat-curing a mixture of lubricating oil or lubricating grease and a thermoplastic resin or a thermosetting resin; and
contact seals made of fluorine rubber sealing said solidified lubricating oil in the rolling bearing,
wherein the solidified lubricating oil is disposed on and wraps around portions of the retainer between the rolling elements,
wherein the solidified lubricating oil forms a mass in the space between each pair of adjacent rolling elements and between the inner bearing ring and the outer bearing ring, and each mass has a dimension in an axial direction of the rolling bearing which is substantially larger than a dimension of the mass in a radial direction of the rolling bearing and a dimension of the mass in a circumferential direction of the rolling bearing, and
wherein the solidified lubricating oil is spaced apart from the inner bearing ring and the outer bearing ring to prevent contact between metal abrasion powder and rolling surfaces of the inner bearing ring and the outer bearing ring.

3. The rolling bearing of claim 2, wherein the contact seals prevent infiltration of a corrosive fluoride into a gap between the inner bearing ring and the outer bearing ring such that the rolling bearing can be used in a cleaning/chemical polishing apparatus and can be brought into contact with the corrosive fluoride.

4. The rolling bearing of claim 3, wherein said corrosive fluoride is hydrofluoric acid.

5. The rolling bearing of claim 1, wherein the contact seals prevent infiltration of a corrosive fluoride into a gap between the inner bearing ring and the outer bearing ring such that the rolling bearing can be used in a cleaning/chemical polishing apparatus and can be brought into contact with the corrosive fluoride.

6. The rolling bearing of claim 5, wherein said corrosive fluoride is hydrofluoric acid.

7. The rolling bearing of claim 1, wherein the rolling elements are balls, and the dimension of each mass of solidified lubricating oil in the axial direction of the rolling bearing is greater than the diameter of the balls.

8. The rolling bearing of claim 1, wherein each mass of solidified lubricating oil has a cross section which is substantially rectangular, the cross section being in a plane parallel to the axial direction of the rolling bearing.

9. The rolling bearing of claim 1, wherein both the inner bearing ring and the outer bearing ring have a raceway which contacts the rolling elements, and each mass of solidified lubricating oil extends beyond the raceways in the axial direction of the rolling bearing.

10. A corrosion-resistant rolling bearing comprising:
an inner bearing ring made of stainless steel;
an outer bearing ring made of stainless steel;
rolling elements made of a ceramic material provided between the inner bearing ring and the outer bearing ring for allowing movement of the inner bearing ring relative to the outer bearing ring;
a retainer made of stainless steel, the retainer spacing adjacent rolling elements apart from each other;
a solidified lubricating oil sealed in the rolling bearing, said solidified lubricating oil being made by heat-curing a mixture of lubricating oil or lubricating grease and a thermoplastic resin or a thermosetting resin; and
contact seals made of fluorine rubber sealing said solidified lubricating oil in the rolling bearing,
wherein the solidified lubricating oil is disposed on and wraps around portions of the retainer between the rolling elements,
wherein the solidified lubricating oil forms a mass in the space between each pair of adjacent rolling elements and between the inner bearing ring and the outer bearing ring, and each mass has a dimension in an axial direction of the rolling bearing which is substantially larger than a dimension of the mass in a radial direction of the rolling bearing and a dimension of the mass in a circumferential direction of the rolling bearing, and
wherein the solidified lubricating oil is spaced apart from the inner bearing ring and the outer bearing ring to prevent contact between metal abrasion powder and rolling surfaces of the inner bearing ring and the outer bearing ring.

11. The rolling bearing of claim 10, wherein a first gap is provided between the solidified lubricating oil and the outer bearing ring and a second gap is provided between the solidified lubricating oil and the inner bearing ring.

12. The rolling bearing of claim 10, wherein the solidified lubricating oil circumscribes the portions of the retainer between the rolling elements.

13. The rolling bearing of claim 10, wherein said lubricating oil or lubricating grease contains perfluoropolyether.

14. The rolling bearing of claim 13, wherein the contact seals prevent infiltration of a corrosive fluoride into a gap between the inner bearing ring and the outer bearing ring such that the rolling bearing can be used in a cleaning/chemical polishing apparatus and can be brought into contact with the corrosive fluoride.

15. The rolling bearing of claim 14, wherein said corrosive fluoride is hydrofluoric acid.

16. The rolling bearing of claim 10, wherein the contact seals prevent infiltration of a corrosive fluoride into a gap between the inner bearing ring and the outer bearing ring such that the rolling bearing can be used in a cleaning/chemical polishing apparatus and can be brought into contact with the corrosive fluoride

17. The rolling bearing of claim 16, wherein said corrosive fluoride is hydrofluoric acid.

18. The rolling bearing of claim 10, wherein the rolling elements are balls, and the dimension of each mass of solidified lubricating oil in the axial direction of the rolling bearing is greater than the diameter of the balls.

19. The rolling bearing of claim 10, wherein each mass of solidified lubricating oil has a cross section which is substantially rectangular, the cross section being in a plane parallel to the axial direction of the rolling bearing.

20. The rolling bearing of claim 10, wherein both the inner bearing ring and the outer bearing ring have a raceway which contacts the rolling elements, and each mass of solidified lubricating oil extends beyond the raceways in the axial direction of the rolling bearing.

* * * * *